July 21, 1959   C. P. KOLTHOFF, JR   2,895,503
SPRING VALVE
Filed June 25, 1956
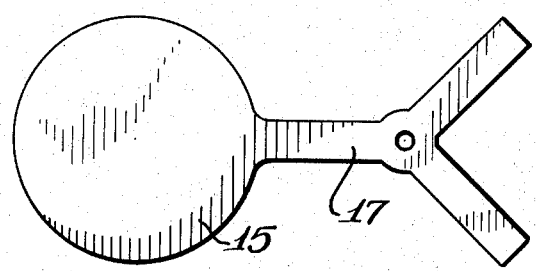
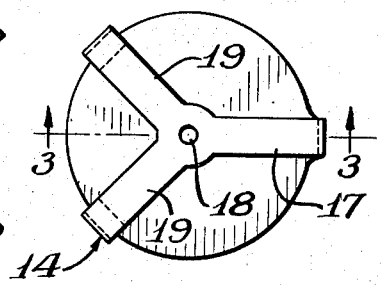
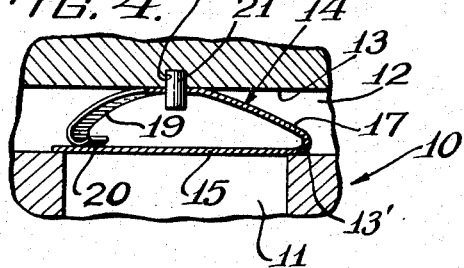
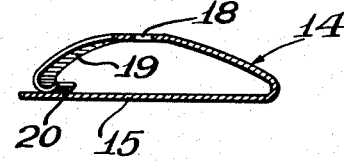
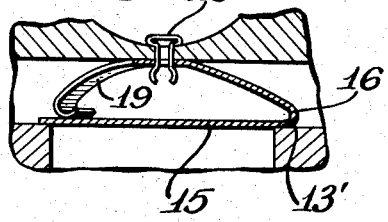
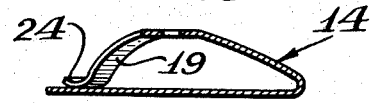
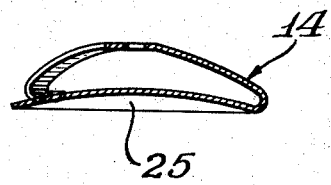
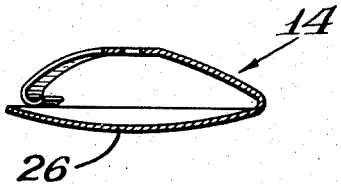
Inventor:
C. Paul Kolthoff, Jr.
Atty.

United States Patent Office 2,895,503
Patented July 21, 1959

2,895,503

SPRING VALVE

C. Paul Kolthoff, Jr., Naperville, Ill., assignor to International Harvester Company, a corporation of New Jersey Application June 25, 1956, Serial No. 593,715

3 Claims. (Cl. 137—535)

This invention relates to valves and more particularly to a spring type of pressure actuated valve.

It is a prime object of this invention to provide an improved type of pressure actuated valve which is particularly adapted for controlling fluid flow in passages formed in the housings of free piston engines.

A more general object is to provide an improved pressure actuated valve which is simple to manufacture, is inexpensive in cost, and is particularly effective in response to pressure in fluid conduits or bores.

Still another object is to provide an improved spring type valve construction particularly adapted to open and close the ends of an open end bore which is disposed in communicating relation with respect to a transversely extending passage having a wall positioned immediately opposite the open end of the bore.

A more specific object is to provide an improved valve construction for closing the open end of a bore in communication with a transverse passage, the said valve construction having spring type fingers adapted to resiliently engage a valve member for firmly maintaining said valve member in close relation with respect to the bore, the spring fingers, however, being resiliently displaceable upon a predetermined pressure within the bore whereby the valve member is unseated to provide for communication between the bore and the transverse passage.

These and other objects will become more readily apparent from a reading of the specification when examined in connection with the accompanying sheet of drawing.

In the drawing:

Figure 1 is a plan view showing a valve member in a certain stage of its formation;

Figure 2 is a plan view of a spring type valve member formed from a blank shown in Figure 1;

Figure 3 is a cross sectional view through a valve member taken substantially along the line 3—3 of Figure 2;

Figure 4 is a cross sectional view through a portion of a housing having first and second passages, with a spring type valve member, shown in section, disposed in operative relation with respect to said passages;

Figure 5 is a view similar to Figure 4 showing a modified connection for connecting a spring type valve member to a housing;

Figure 6 is a cross sectional view similar to Figure 3, however showing a modified type of spring type valve member;

Figure 7 is a cross sectional view, similar to Figure 6 showing, however, another modified form of a spring type valve member; and Figure 8 is a cross sectional view similar to Figure 7 showing another modified form of spring type valve member.

Referring now particularly to Figure 4, a casing or housing is generally indicated by the reference character 10. The casing or housing 10 may form part of a free piston engine wherein a passage or bore 11 is adapted to communicate with a transversely extending passage or bore 12. The invention, of course, is not confined to free piston engines, but the type of passage arrangement is often found in such an engine. The valve member, of course, may be utilized in any construction having passages substantially positioned in the relationship shown in Figure 4. The transverse passage 12 also includes a wall portion or support 13 positioned immediately opposite the open end of the bore 11. The open end of the bore 11 is defined by an annular valve seat generally designated at 13'. Referring now particularly to Figures 1, 2, 3 and 4, a valve is generally designated by the reference character 14. The valve 14 is shown in developed blank form in Figure 1 prior to its formation into the configuration shown in Figures 2, 3 and 4. As shown in Figure 1, the valve 14 initially may be blanked out by suitable die means from a spring steel material and after a suitable forming operation it will assume the configuration shown in Figures 2, 3 and 4.

The valve 14 comprises a circular valve flap or member 15 having integrally connected thereto at a peripheral portion, a spring loop 16 integrally connected to a curved arm 17. The curved arm 17 extends inwardly toward the center of the valve member 15 and terminates in a central portion spaced laterally from the valve member 15. The curved arm 17 is also provided with a hole 18 and the end of said curved arm 17 is integrally connected to spring-like fingers 19 which also curve downwardly toward the valve member 15 and are disposed in diverging relation as best shown in Figure 2. The fingers 19 may be stated as diverging radially outwardly toward the peripheral portion of the valve member 15. The lower ends of the fingers 19 are provided with curved contacting or engaging portions 20 which, as shown in Figures 2, 3 and 4, curve inwardly toward the center of the valve member 15.

As best shown in Figure 4, the valve member 15 is seated upon the valve seat 13' and a pin 21 extends through the opening 18 and into a bore 22 formed in the casing 10 for maintaining the valve member properly positioned over the open end of the bore 11 and on the seat 13'. In Figure 5 a modified connecting means is shown in the form of a hairpin type spring fastener 23 which suitably fastens the valve member 15 in position.

Figures 6, 7 and 8 show modified forms of the invention, but in each case the reference characters are the same for identical elements. In Figure 6 engaging portions 24 on the fingers 19 curve in a direction outwardly of the center of the valve member 15. In Figure 7 the valve member 15 is dished inwardly in a direction toward the arm 17 and fingers 19. In Figure 8 the valve member 15 is dished outwardly in a direction away from the arm 17 and fingers 19. The modified forms of the invention may be fastened in the casing 10 in the same manner as indicated in Figures 4 and 5.

In operation the valve member 15 is urged away from the valve seat 13' during a predetermined pressure within the bore 11. The valve member 15 is urged upwardly against the downward pressure exerted by the springlike fingers 19 and arm 17, and they are effective to securely, though resiliently, maintain the valve member 15 against the valve seat 13'. By the novel arrangement of the fingers a strong resilient pressure is applied against the valve member 15 and effective valving is obtained. The construction particularly is inexpensive in manufacture and provides a positive action valve which has an indefinite life due to its resiliency and construction.

The modifications of Figures 6, 7 and 8 show various other configurations to which the valve construction is particularly adapted. The dish shape of Figure 7 particularly assures that the edges of the valve member 15 tightly and sealingly engage the valve seat 13'. The same positive sealing action is obtained by the outwardly dished arrangement of the valve member 15 shown by the reference character 26.

Thus the objects of the invention have been fully achieved and it must be understood that changes and modifications may be made without departing from the spirit of the invention as disclosed or the scope thereof as defined in the appended claims.

What is claimed is:

1. A valve for an open end bore terminating at one end in a valve seat, said bore being adapted to communicate with a passage having at least portions extending generally transversely with respect to said bore and having a support positioned opposite said valve seat comprising; a valve member of spring-like material seated upon said valve seat, means normally urging said valve member against said seat to close said open end bore including an arm, a spring-like connector element integral with said arm and said valve member connecting said arm to a peripheral portion of said valve member, said arm extending radially inwardly toward the center of said valve member, a portion of said arm disposed centrally of said valve member being laterally spaced from said valve member, a pair of spring fingers connected to said arm, said fingers and said arm having a generally arcuate configuration, the fingers diverging radially outwardly from said arm, spring loops connected to the free ends of said fingers and extending radially inwardly, and means connecting said arm to the support opposite said valve seat whereby said loops engage said valve member and said fingers resiliently urge said valve member against said seat during a predetermined pressure in said bore, said valve member being displaceable from said seat during a predetermined pressure rise in said bore.

2. A valve for an open end bore terminating at one end in a valve seat, said bore being adapted to communicate with a passage having portions extending generally transversely with respect to said bore and having a support positioned opposite said valve seat comprising; a valve member seated upon said valve seat, means normally urging said valve member against said seat to close said open end bore including an arm, a spring-like connector element integral with said arm and said valve member connecting said arm to a peripheral portion of said valve member, said arm extending radially inwardly toward the center of said valve member, the greater portion of said arm disposed centrally of said valve member being laterally spaced from said valve member, a pair of spring fingers connected to said arm, said fingers and said arm having a generally arcuate configuration, the fingers diverging radially outwardly from said arm, spring loops connected to the free ends of said fingers and extending radially inwardly, and means connecting said arm to the support opposite said valve seat whereby said loops engage said valve member and said fingers resiliently urge said valve member against said seat during a predetermined pressure in said bore, said valve member being displaceable from said seat during a predetermined pressure rise in said bore.

3. A valve for an open end bore terminating at one end in a valve seat, said bore being adapted to communicate with a passage having portions extending generally transversely with respect to said bore and having a support positioned opposite said valve seat comprising; a valve member seated upon said valve seat, means normally urging said valve member against said seat to close said open end bore including an arm, a spring-like connector element integral with said arm and said valve member connecting said arm to a peripheral portion of said valve member, said arm extending radially inwardly toward the center of said valve member, a portion of said arm being laterally spaced from said valve member, a pair of spring fingers connected to said arm, said fingers and said arm having a generally arcuate configuration, the fingers diverging radially outwardly from said arm, curved engaging portions connected to the free ends of said fingers and extending radially inwardly, and means connecting said arm to the support opposite said valve seat whereby said engaging portions engage said valve member and said fingers resiliently urge said valve member against said seat during a predetermined pressure in said bore, said valve member being displaceable from said seat during a predetermined pressure rise in said bore.

References Cited in the file of this patent

UNITED STATES PATENTS

| 666,145 | Kennedy | Jan. 15, 1901 |
| 797,739 | Meer | Aug. 22, 1905 |
| 881,516 | Willaredt | Mar. 10, 1906 |
| 1,227,759 | Day | May 29, 1917 |
| 1,637,821 | Heideman | Aug. 2, 1927 |
| 2,149,434 | Guidobaldi | Mar. 7, 1939 |
| 2,599,499 | Thorstenson | June 3, 1952 |